(12) United States Patent
Xing et al.

(10) Patent No.: US 11,880,903 B2
(45) Date of Patent: Jan. 23, 2024

(54) BAYESIAN IMAGE DENOISING METHOD BASED ON DISTRIBUTION CONSTRAINT OF NOISY IMAGES

(71) Applicant: Tsinghua University, Beijing (CN)

(72) Inventors: Yuxiang Xing, Beijing (CN); Li Zhang, Beijing (CN); Hewei Gao, Beijing (CN); Zhi Deng, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 224 days.

(21) Appl. No.: 17/380,236

(22) Filed: Jul. 20, 2021

(65) Prior Publication Data

US 2022/0020123 A1 Jan. 20, 2022

(30) Foreign Application Priority Data

Jul. 20, 2020 (CN) .......................... 202010696129.6

(51) Int. Cl.
*G06T 5/00* (2006.01)
(52) U.S. Cl.
CPC .... *G06T 5/002* (2013.01); *G06T 2207/20076* (2013.01); *G06T 2207/20081* (2013.01); *G06T 2207/20084* (2013.01)
(58) Field of Classification Search
None
See application file for complete search history.

(56) References Cited

PUBLICATIONS (Patel DV, Oberai AA. GAN-based priors for quantifying uncertainty. arXiv preprint arXiv:2003.12597. Mar. 27, 2020.). (Year: 2020).*
Kataoka S, Yasuda M. Bayesian image denoising with multiple noisy images. The Review of Socionetwork Strategies. Oct. 2019;13: 267-80. (Year: 2019).*
Sanches JM, Nascimento JC, Marques JS. Medical image noise reduction using the Sylvester-Lyapunov equation. IEEE transactions on image processing. Aug. 12, 2008;17(9):1522-39. (Year: 2008).*
Patel D, Oberai AA. Bayesian inference with generative adversarial network priors. arXiv preprint arXiv:1907.09987. Jul. 22, 2019. (Year: 2019).*

* cited by examiner

*Primary Examiner* — Vincent Rudolph
*Assistant Examiner* — Meredith I Taylor
(74) *Attorney, Agent, or Firm* — Hodgson Russ LLP

(57) ABSTRACT

Embodiments of the present disclosure provide a Bayesian image denoising method based on a distribution constraint of noiseless images from a distribution of noisy images. The method includes: determining a distribution constraint of noiseless images from a distribution of noisy images; and performing Bayesian denoising on noisy images based on the distribution constraint of noiseless images.

11 Claims, 3 Drawing Sheets

BAYESIAN IMAGE DENOISING METHOD BASED ON DISTRIBUTION CONSTRAINT OF NOISY IMAGES

CROSS-REFERENCE TO RELATED APPLICATIONS

This application claims priority to and benefits of Chinese Patent Application Serial No. 202010696129.6, filed on Jul. 20, 2020, the entire disclosure of which is incorporated by reference herein.

FIELD

The present disclosure relates to the field of digital image processing and computer vision technologies, and more particularly, to a Bayesian image denoising method based on a distribution constraint of noiseless images from a distribution of noisy images.

BACKGROUND

In the process of image acquisition, such as photography, public safety monitoring, medical imaging, and microscopic imaging, due to factors such as the random characteristics of physical signals, environmental interference and the own state changes of systems, the collected images inevitably contain noise, which significantly affects the image quality. Image denoising is an important method and technology in image processing, which aims to reduce the random noise and restore the effective information of images.

Classical image denoising methods include mean filtering, median filtering, Gaussian low-pass filtering and other filtering methods. These filters limit the noise related components of the image to achieve the effect of noise removal. The filtering method may be implemented in both the image domain and the transform domain after a specific transformation on the image, such as the frequency domain, wavelet domain, etc. However, the filtering method has an inherent disadvantage in preserving image details. In addition to the analytical filtering method, the image iterative optimization method based on Bayesian posteriori probability distribution is another kind of image denoising method, which can remove noise by introducing additional penalty terms such as total variation minimization and Markov random field potential energy function minimization. The Bayesian posterior estimation method can produce a more accurate noiseless image estimation, but the result is significantly dependent on the penalty term imposed.

In recent years, with the development of artificial neural network and deep learning technology, the application of deep learning method to image denoising has significantly improved the effect of image denoising. Compared with the classical methods, the image details can be recovered more accurately while removing noise. Although a variety of neural networks in many applications show strong image denoising and image restoration capabilities, they are all dependent on a large number of training datasets. Supervised learning requires paired noisy images and noiseless images as truth values for network training. Generative adversarial learning can extract the distribution rules and features of noiseless images from the unpaired noiseless image dataset, and then the image denoising is performed, eliminating the requirement of data pairing. However, in most applications, real noiseless data is often difficult to obtain or expensive to acquire, which makes it difficult for deep learning in the application of image denoising.

SUMMARY

Embodiments of the present disclosure provide a Bayesian image denoising method based on a distribution constraint of noiseless images from a distribution of noisy images. The method includes: determining a distribution constraint of noiseless images from a distribution of noisy images; and performing Bayesian denoising on noisy images based on the distribution constraint of noiseless images.

Additional aspects and advantages of the present disclosure will be given in the following description, and some of them will become apparent from the following description or be known through the practice of the present disclosure.

DETAILED DESCRIPTION

Figure 1:
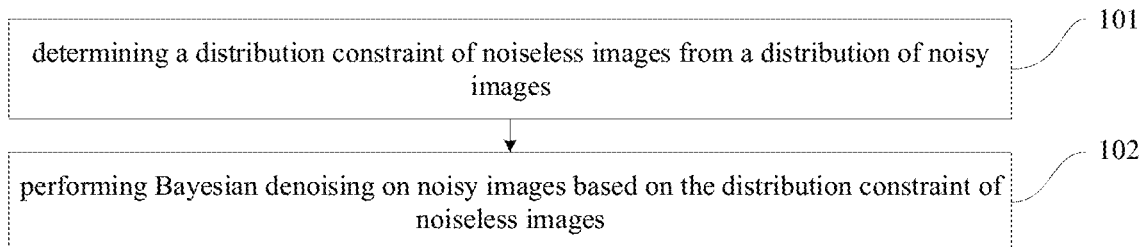
FIG. 1 is a flowchart of a Bayesian image denoising method based on a distribution constraint of noiseless images from a distribution of noisy images according to an embodiment of the disclosure.

Embodiments of the present disclosure provide a Bayesian image denoising method based on a distribution constraint of noisy images. As illustrated in FIG. 1, the method may include followings.

At block 101, a distribution constraint of noiseless images is determined from a distribution of noisy images.

At block 102, Bayesian denoising is performed on noisy images based on the distribution constraint.

The distribution constraint of the noiseless images may be determined as follows.

For images of which the distribution can be accurately or approximately expressed analytically, the distribution constraint of noiseless images is estimated using a characteristic function method as follows.

(1) a probability density function $f_Z$ of a random vector Z for noisy images generated by an imaging system is estimated analytically, and a probability density function $f_N$ of a random vector N for additive noise of the imaging system is estimated analytically.

(2) Fourier transformation is performed on the probability density functions $f_Z$ and $f_N$, to obtain the characteristic function $F_Z$ of the random vector Z and the characteristic function $F_N$ of the random vector N.

(3) a characteristic function $F_S$ of a random vector S for noiseless images is obtained based on the characteristic function $F_Z$ of the random vector Z and the characteristic function $F_N$ of the random vector N according to a formula of $F_S = F_Z / F_N$.

Alternatively, with the objective optimization method, according to the consistency between the characteristic function $F_S$ of and $F_Z/F_N$, the estimation value $F_S^*$ of the characteristic function $F_S$ is obtained by:

$$F_S^* = \underset{F_S}{\mathrm{argmin}}\Phi(F_S, F_Z/F_N),$$

where $\Phi(g, g)$ is a distance measure between the characteristic functions of two random vectors, and argmin represents optimizing parameter $F_S$ so that the objective function is minimized.

(4) inverse Fourier transformation is performed on the characteristic function $F_S$ or the estimation value $F_S$, to obtain a probability density function $f_S$ of the random vector S, i.e., a distribution of the random vector S is obtained.

(5) analytical filtering denoising or Bayesian iterative denoising is performed on a set of noisy image samples $z_1$, $z_2$, $z_3$, ..., $z_n$, to obtain initial estimation of the set $\hat{S}$ for estimated noiseless image sample $\hat{s}_1$, $\hat{s}_2$, $\hat{s}_3$, ... $\hat{s}_n$.

(6) a distribution distance $D(\hat{S},S)$ between the distribution of set $\hat{S}$ and the distribution of the random vector S is calculated according to a distribution distance function D, and the distribution distance $D(\hat{S},S)$ is determined as the distribution constraint of noiseless images for estimating noiseless images.

The distribution distance $D(\hat{S},S)$ is calculated using the method of a neural network discriminator, which includes followings.

(6-1) Assume that the distribution distance function D contains a neural network discriminator $\Omega_D$ as a distribution distance operator, in which the neural network discriminator has a parameter set $\theta_D$.

(6-2) the distribution of the set $\hat{S}$ and the distribution of random vector S are used to compute distribution distance $D(\hat{S},S)$ where the distribution distance function D is defined by a cross entropy distance function, which is realized by the neural network discriminator $\Omega_D$:

$$D(\hat{S}, S) = \sum_{i=1:n} \log(\Omega_D(s_i; \theta_D)) + \log(1 - \Omega_D(\hat{s}_i; \theta_D))$$

or a Wasserstein distance function:

$$D(\hat{S}, S) = \sum_{i=1:n} |\Omega_D(s_i; \theta_D) - \Omega_D(\hat{s}_i; \theta_D)|;$$

where, $s_1$, $s_2$, $s_3$, ..., $s_n$ are n samples from the distribution of the random vector S for noiseless images.

Alternatively, the distribution distance function in other generative adversarial network methods in the generative adversarial network field can be adopted. The generative adversarial network methods in the generative adversarial network filed is any one of Standard GAN (SGAN), Region-Separative GAN (RSGAN), Relativistic average Standard GAN (RaSGAN), Least Squares GAN (LSGAN), Relativistic average Least Squares GAN (RaLSGAN), Hinge-loss GAN (HingeGAN) Wasserstein GAN with Gradient Penalty (WGAN-GP), Region-Separative GAN with Gradient Penalty (RSGAN-GP) or Relativistic average Standard GAN with Gradient Penalty (RaSGAN-GP).

For images of which the distribution is difficult to be expressed analytically, or for images of which the distribution calculation is too complex, the distribution distance is estimated using indirect distribution constraint method, which includes followings.

(1) analytical filtering or Bayesian iterative denoising is performed on a group of noisy image samples $z_1$, $z_2$, $z_3$, ..., $z_n$ generated by an imaging system to obtain initial estimation of the corresponding estimated noiseless image samples $\hat{s}_1$, $\hat{s}_2$, $\hat{s}_3$, ..., $\hat{s}_n$.

(2) a probability density function $f_N$ of a random vector N for additive noise of the imaging system is estimated analytically, and noise samples $n_1^*$, $n_2^*$, $n_3^*$, ..., $n_n^*$ are sampled from the distribution of the random vector N, and the number of the noise samples $n_1^*$, $n_2^*$, $n_3^*$, ..., $n_n^*$ is the same as that of the noisy image samples $z_1$, $z_2$, $z_3$, ..., $z_n$.

Alternatively, when there is no signal, the noise samples $n_1^*$, $n_2^*$, $n_3^*$, ..., $n_n^*$ of the imaging system are collected practically.

(3) the noise samples $n_1^*$, $n_2^*$, $n_3^*$, ..., $n_n^*$ and the estimated noiseless image samples $\hat{s}_1$, $\hat{s}_2$, $\hat{s}_3$, ..., $\hat{s}_n$ are added to generate estimated noisy image sample $\hat{z}_1$, $\hat{z}_2$, $\hat{z}_3$, ..., $\hat{z}_n$, in which $\hat{z}_i=\hat{s}_i+n_i^*$, i=1:n.

(4) The distribution distance $D(\hat{Z},Z)$ between a set $\hat{Z}$ for the estimated noisy image samples $\hat{z}_1$, $\hat{z}_2$, $\hat{z}_3$, ... $\hat{z}_n$ and a set Z for the noisy image samples $z_1$, $z_2$, $z_3$, ..., $z_n$ is calculated according to a distribution distance function D, and the distribution distance $D(\hat{Z},Z)$ is determined as distribution constraint of noiseless images.

The distribution distance $D(\hat{Z},Z)$ is calculated using the method of a neural network discriminator, which includes followings.

(4-1) Assume that the distribution distance function D contains a neural network discriminator $\Omega_D$ as a distribution distance operator, in which the neural network discriminator $\Omega_D$ has a parameter set $\theta_D$.

(4-2) the set $\hat{Z}$ and the set Z of real noisy image samples are inputted into the distribution distance function D, and the neural network discriminator $\Omega_D$ is used to calculate a cross entropy distance function between the distribution of the set $\hat{Z}$ and the distribution of the set Z:

$$D(\hat{Z}, Z) = \sum_{i=1:n} \log(\Omega_D(z_i; \theta_D)) + \log(1 - \Omega_D(\hat{z}_i; \theta_D))$$

or a Wasserstein distance function:

$$D(\hat{Z}, Z) = \sum_{i=1:n} |\Omega_D(z_i; \theta_D) - \Omega_D(\hat{z}_i; \theta_D)|.$$

Alternatively, the distribution distance function in other generative adversarial network methods in the generative adversarial network field can be adopted. The generative adversarial network methods in the generative adversarial network filed is any one of Standard GAN (SGAN), Region-Separative GAN (RSGAN), Relativistic average Standard GAN (RaSGAN), Least Squares GAN (LSGAN), Relativistic average Least Squares GAN (RaLSGAN), Hinge-loss GAN (HingeGAN) Wasserstein GAN with Gradient Penalty (WGAN-GP), Region-Separative GAN with Gradient Penalty (RSGAN-GP) or Relativistic average Standard GAN with Gradient Penalty (RaSGAN-GP).

A probability density function $f_N$ of a random vector N for additive noise of the imaging system is estimated analytically includes: obtaining a distribution form of the random vector N for additive noise according to physical laws of the imaging system, and obtaining the probability density function $f_N$ of the random vector N by measuring distribution parameters of the random vector N through simulation or actual experiments.

Alternatively, a probability density function $f_N$ of a random vector N for additive noise of the imaging system is estimated analytically: Gaussian mixture distribution is used to fit the unknown distribution. First, assume that the random vector N for additive noise obeys a Gaussian mixture distribution, and then the probability density function $f_N$ of the random vector N for additive noise is obtained by measuring Gaussian mixture distribution parameters through simulation or actual experiments.

A probability density function $f_N$ of a random vector N for additive noise of the imaging system is estimated analytically includes: transforming a distribution of non-additive noise into an approximate additive noise through a specific mathematical transformation, and then the probability density function $f_N$ of the random vector N for additive noise is obtained.

In above methods, a probability density function $f_Z$ of a random vector Z for noisy images generated by an imaging system is estimated analytically includes: obtaining the probability density function $f_Z$ of the random vector Z for noisy images through frequency statistics of a large number of noisy image samples.

Alternatively, a probability density function $f_Z$ of a random vector Z for noisy images generated by an imaging system is estimated analytically includes: obtaining a distribution form of the random vector Z for noisy images using a known distribution model assumption, and estimating the probability density function $f_Z$ of the random vector Z for noisy images by measuring distribution parameters of the random vector Z through simulation or actual experiments.

Bayesian denoising is performed on noisy images based on the distribution constraint as follows.

(1) a Bayesian posterior cost function $\Psi$ is constructed for noisy image samples $z_1, z_2, z_3, \ldots, z_n$ and estimated noiseless image samples $\hat{s}_1, \hat{s}_2, \hat{s}_3, \ldots, \hat{s}_n$:

$$\psi(\hat{s}_1, \hat{s}_2, \hat{s}_3, \ldots, \hat{s}_n) = \sum_{i=1:n} \varphi_f(z_i - \hat{s}_i) + \lambda D$$

the first term $\varphi_f$ of the Bayesian posterior cost function $\Psi$ is a data fidelity term between noisy image samples $z_1, z_2, z_3, \ldots, z_n$ and the estimated noiseless image samples $\hat{s}_1, \hat{s}_2, \hat{s}_3, \ldots, \hat{s}_n$, the second term D is the distribution constraint, that is, $D(\hat{S},S)$ or the distribution distance $D(\hat{Z},Z)$, $\lambda$ is a hyperparameter adjusting the importance of the distribution constraint.

(2) the Bayesian posterior cost function $\Psi$ is minimized to obtain final estimated noiseless images $\hat{s}_1, \hat{s}_2, \hat{s}_3, \ldots \hat{s}_n$, thereby realizing image denoising.

The Bayesian posterior cost function $\Psi$ is minimized using a classical mathematical optimization method, including any one of a Lagrange multiplier method, an alternate iteration method, an alternative conjugate least square method or a gradient optimization algorithm.

Alternatively, The Bayesian posterior cost function $\Psi$ is minimized using a neural network optimization method, which includes followings.

(1) an image denoising neural network $\Omega_E$ is constructed as an image denoising operator $\hat{s}_i \equiv \Omega_E(z_i; \theta_E)$, i=1:n, where $\theta_E$ is a parameter set of the image denoising neural network.

(2) taking the Bayesian posterior cost function $\Psi$ as the cost function to train the image denoising neural network, the image denoising neural network is trained using a dataset with a large number of noisy image samples.

(3) the noisy images are inputted into the image denoising neural network $\Omega_E$, and the estimated noiseless images are outputted as Bayesian denoising results.

The distribution distance function D is an analytical distribution distance function. The analytic distribution distance function includes a distribution distance function of K-L divergence or J-S divergence.

Deep learning shows good performance in the application of image denoising. Compared with the classical filtering methods, the effect is significantly improved, but the deep learning method relies heavily on the noiseless image dataset. The requirement for noiseless datasets limits the implementation and application situations of deep learning in real image denoising. In Bayesian posterior probability theory, the estimation of noiseless images from noisy images depends on the modeling of the prior distribution of noiseless images. The disclosure first proposes a method of learning the distribution of noiseless images from the noisy image samples under the condition that the distribution model of additive noise is known. The disclosure further proposes a method of transforming the distribution constraint of the noisy images into the distribution constraint of noiseless images for Bayesian denoising. The disclosure also proposes a neural network optimization method for Bayes denoising which trains the image denoising neural network in an unsupervised way. The disclosure is to make full use of noisy image samples to accurately learn the implicit distribution features of noiseless images, and then realize efficient image denoising.

The images in the method of the disclosure refers to two-dimensional or three-dimensional signals in general, including visible images, clinical medical images, microscopic images and other images. This method may be applied to many fields such as photograph, imaging for public safety inspection, medical imaging, microscopic imaging, etc.

Embodiments of the method of the disclosure presented as follows.

Embodiment 1: Denoising of Noisy Handwritten Numeral Images

The imaging system used in this embodiment is a handwritten numeral acquisition system.

Noisy images: noisy handwritten numeral images, with image resolution of 28*28

Noiseless images: noiseless handwritten numeral images, with image resolution of 28*28.

(1) A distribution constraint of noiseless handwritten numeral images is determined based on a distribution of noisy handwritten numeral images as follows.

(1-1) A probability density function $f_Z$ of a random vector Z for noisy handwritten numeral images is estimated in an analytic form.

70,000 noisy handwritten numeral image samples are collected from the handwritten numeral acquisition system, and the probability density function $f_Z$ of the random vector Z of noisy handwritten numeral images is obtained through frequency statistics of these 70,000 noisy image samples.

(1-2) A probability density function $f_N$ of a random vector N for additive noise contained in the handwritten numeral acquisition system is estimated analytically:

Gaussian mixture distribution is used to fit the distribution of the random vector N. First, assume that each pixel of the additive noise random vector obeys a five-dimensional Gaussian mixture distribution, noise samples are obtained from zero-signal pixels in the noisy handwritten numeral images, and these noise samples are used to estimate the parameters of five-dimensional Gaussian mixture distribution through a maximum likelihood method, thus the probability density function $f_N$ of the additive noise random vector N is obtained.

(1-3) Fourier transformation is performed on the probability density function $f_Z$ and probability density function $f_N$ respectively to obtain the characteristic function $F_Z$ or the random vector Z for noisy handwritten numeral images and the characteristic function $F_N$ of the random vector N for additive noise.

(1-4) a characteristic function $F_S$ of a random vector S for noiseless handwritten numeral images is obtained based on the characteristic function $F_Z$ of the random vector Z for noisy handwritten numeral images and the characteristic function $F_N$ of the random vector N for additive noise according to a formula of $F_S = F_Z/F_N$.

(1-5) inverse Fourier transform is performed on the characteristic function $F_S$ of the random vector S for noiseless handwritten numeral images, to obtain the probability density function $f_S$ of the random vector S, that is, the distribution of the random vector S for noiseless handwritten numeral images.

(1-6) analytical filtering denoising is performed for a group of noisy handwritten digital image samples $z_1, z_2, z_3, \ldots z_n$ that need to be denoised by this method to obtain initial estimation of a set S for the estimated noiseless handwritten digital image samples $\hat{s}_1, \hat{s}_2, \hat{s}_3, \ldots, \hat{s}_n$;

(1-7) A distribution distance $D(\hat{S}, S)$ between the distribution of the set $\hat{S}$ for noiseless handwritten numeral image samples and the distribution of the random vector S for noiseless handwritten numeral images is calculated according to K-L distribution distance function D:

$$D(\hat{S}, S) = \sum_{i=1}^{n} \frac{1}{n}\left(\ln \frac{1}{n} - f_s(\hat{s}_i)\right).$$

and the distribution distance $D(\hat{S}, S)$ is used as the distribution constraint of noiseless handwritten numeral images for estimating noiseless images.

(2) Bayesian denoising is performed on noisy handwritten numeral images based on the distribution constraint $D(\hat{S}, S)$ including the following steps:

(2-1) For the group of noisy handwritten numeral image samples $z_1, z_2, z_3, \ldots, z_n$ that need to be denoised by this method and the corresponding estimated noiseless handwritten digital image samples $\hat{s}_1, \hat{s}_2, \hat{s}_3, \ldots, \hat{s}_n$, a Bayesian posterior cost function $\Psi$ is constructed:

$$\psi(\hat{s}_1, \hat{s}_2, \hat{s}_3, \ldots, \hat{s}_n) = \sum_{i=1:n} \varphi_f(z_i - \hat{s}_i) + \lambda D(\hat{S}, S)$$

the first term $\varphi_f$ of the Bayesian posterior cost function $\Psi$ is a data fidelity term between the noisy handwritten numeral image samples $z_1, z_2, z_3, \ldots, z_n$ and estimated noiseless handwritten digital image samples $\hat{s}_1, \hat{s}_2, \hat{s}_3, \ldots, \hat{s}_n$, and the second term $(\hat{S}, S)$ is the distribution constraint, $\lambda$ is a hyperparameter adjusting the importance of the distribution constraint.

(2-2) Gradient optimization algorithm is adopted to minimize the Bayesian posterior cost function $\Psi$, to obtain the final estimated noiseless handwritten numeral image sample $\hat{s}_1, \hat{s}_2, \hat{s}_3, \ldots, \hat{s}_n$, realizing image denoising.

Embodiment 2: Nighttime Photograph Denoising

The imaging system used in this embodiment is: camera
Noisy images: noisy photograph patches with the image resolution of 512*512
Noiseless images: Noiseless photograph patches, with image resolution of 512*512

The resolution of the original noisy photograph is usually greater than 512*512. Noisy photograph patches of 512*512 is extracted from the original noisy photograph. Each noisy photograph patch is denoised to obtain an estimation of noiseless photograph patch, and then the estimated noiseless photograph may be obtained by concatenating together the noisy photograph patches.

(1) A distribution constraint of noiseless photograph patches is determined based on a distribution of noisy photograph patches including the following steps.

(1-1) A set Z for noisy photograph patch samples $z_1, z_2, z_3, \ldots, z_n$ is collected from the camera. Analytical filtering is performed on a set Z for noisy photograph patch samples $z_1, z_2, z_3, \ldots, z_n$ that need to be denoised by this method to obtain the initial estimation the estimated noiseless photograph patch samples $\hat{s}_1, \hat{s}_2, \hat{s}_3, \ldots, \hat{s}_n$.

(1-2) A probability density function $f_N$ of a random vector N for additive noise in the camera system is estimated analytically.

A Gaussian mixture distribution is used to fit the distribution of the random vector N. First, it is assumed that each pixel of the random vector N obeys the five-dimensional Gaussian mixture distribution. The noise samples are measured when the camera lens is completely blocked, and the parameters of the 5-D Gaussian mixture distribution are estimated by the maximum likelihood method. The probability density function $f_N$ of the random vector N is obtained.

(1-3) Simulated noise samples $n_1^*, n_2^*, n_3^*, \ldots, n_n^*$ are collected from the distribution of the random vector N, in which the number of the simulated noise samples $n_1^*, n_2^*, n_3^*, \ldots, n_n^*$ is the same as the number of noisy image samples.

(1-4) The noise samples $n_1^*, n_2^*, n_3^*, \ldots, n_n^*$ and the estimated noiseless photograph patch samples $\hat{s}_1, \hat{s}_2, \hat{s}_3, \ldots, \hat{s}_n$ are added to obtain a set $\hat{Z}$ for estimated noisy photograph patch samples $\hat{z}_1, \hat{z}_2, \hat{z}_3, \ldots, \hat{z}_n$: $\hat{z}_i = \hat{s}_i + n_i^*$, i=1:n.

The distribution distance $D(\hat{Z}, Z)$ between the distribution of the set $\hat{Z}$ for estimated noisy photograph patch samples and the distribution of the set Z for real noisy photograph patch samples is calculated using the J-S distribution distance function D.

Firstly, a probability density function $f_Z$ of the set Z for the noisy photograph patch samples is estimated analytically. The distribution form of the of the set Z is assumed joint Gaussian distribution model: the set Z for noisy photograph patch samples is generated from independent standard Gaussian distribution of 500 dimensions through linear transformation of which the linear coefficients are denoted as $\theta_L$. The maximum likelihood method is used to calculate the distribution parameter of the set Z for noisy photograph patch samples, i.e. the linear coefficients $\theta_L$. Thus, the probability density function $f_Z$ of the set Z for noisy photograph patch samples is obtained.

Similarly, the probability density function $f_{\hat{Z}}$ of the set $\hat{Z}$ for the estimated noisy photograph patch samples is estimated analytically.

The distribution distance between the distribution of set $\hat{Z}$ estimated noisy photograph patch samples and the distribution of set Z for noisy photograph patch samples is calculated with K-L distribution distance function D:

$$D(\hat{Z}, Z) = \left[\sum_{i=1}^{n} \frac{1}{n}\left(\ln\frac{1}{n} - f_z(\hat{z}_i)\right) + \sum_{i=1}^{n} \frac{1}{n}\left(\ln\frac{1}{n} - f_z(z_i)\right)\right] / 2$$

$D(\hat{Z},Z)$ is defined as the distribution constraint of noiseless photograph patches.

(2) According to the distribution constraint of noiseless photograph patches, Bayesian denoising is performed on the noisy photograph patches.

(2-1) A Bayesian posterior cost function $\Psi$ is constructed for this group of noisy photograph patch samples $z_1, z_2, z_3, \ldots, z_n$ that need to be denoised by this method and corresponding estimated noiseless photograph patch samples $\hat{s}_1, \hat{s}_2, \hat{s}_3, \ldots, \hat{s}_n$:

$$\psi(\hat{s}_1, \hat{s}_2, \hat{s}_3, \ldots, \hat{s}_n) = \sum_{i=1:n} \varphi_f(z_i - \hat{s}_i) + \lambda D(\hat{Z}, Z)$$

the first term $\varphi_f$ of the Bayesian posterior cost function $\Psi$ is the data fidelity term between $z_1, z_2, z_3, \ldots, z_n$ and $\hat{s}_1, \hat{s}_2, \hat{s}_3, \ldots, \hat{s}_n$, and the second term $D(\hat{Z},Z)$ is the distribution constraint, $\lambda$ is a hyperparameter adjusting the importance of the distance constraint $D(\hat{Z},Z)$.

(2-2) Neural network optimization method is adopted for the Bayesian posterior cost function $\Psi$ to obtain the final estimated noiseless photograph patches $\hat{s}_1, \hat{s}_2, \hat{s}_3, \ldots, \hat{s}_n$, realizing image denoising:

An image denoising neural network $\Omega_E$ is constructed as an image denoising operator $\hat{s}_i = \Omega_E(z_i; \theta E)$, i=1:n, where $\theta_E$ is the parameter set of the image denoising neural network; the Bayesian posterior cost function $\Psi$ is taken as the training cost function of the image denoising neural network, and a large noisy image sample dataset is used to train the image denoising neural network:

$$\min_{\theta_E} \sum_{i=1:n} \varphi_f(z_i - \hat{s}_i) + \lambda D(\hat{Z}, Z).$$

During inference, the noisy photograph patches is taken as the input of the image denoising neural network, and the estimated noiseless photograph patch is obtained from the output. This noiseless photograph patches are the final estimated noiseless photograph patches.

Figure 2:
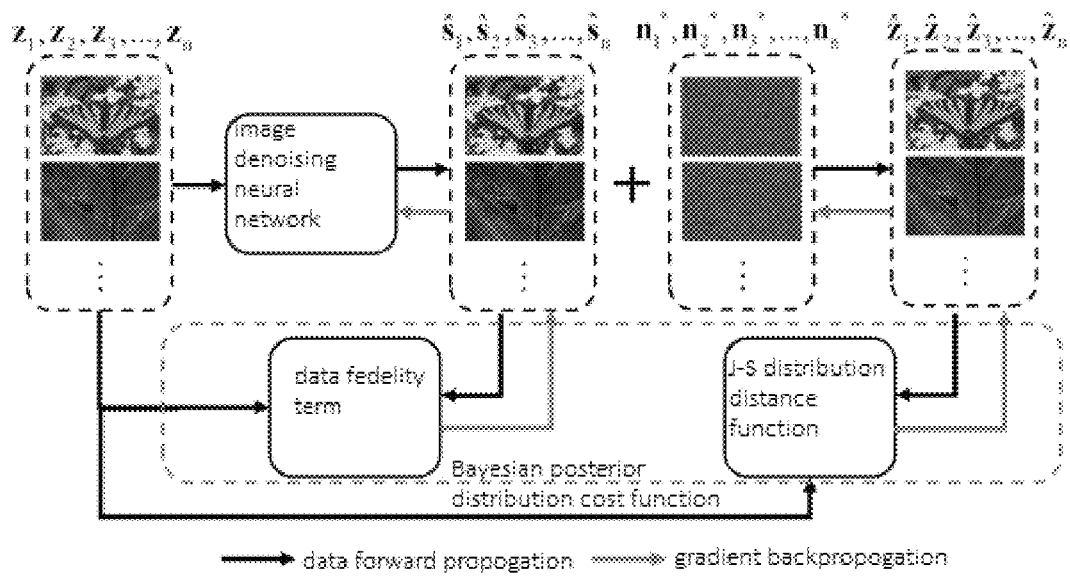
FIG. 2 is a schematic diagram of an image denoising neural network and its cost function in Embodiment 2 of the disclosure.
Figure 3A:
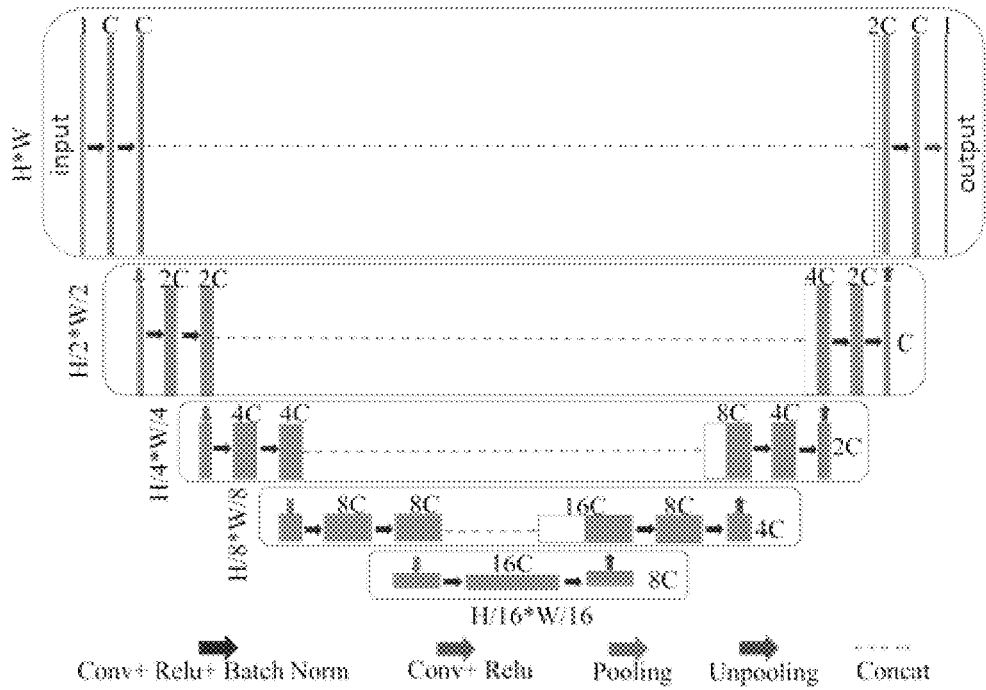
FIG. 3(*a*)-(*b*) is a schematic diagram of an implementation of a neural network structure involved in Embodiment 2 and Embodiment 3 of the disclosure, where (a) is an image denoising neural network and (b) is a neural network discriminator.
Figure 3B:
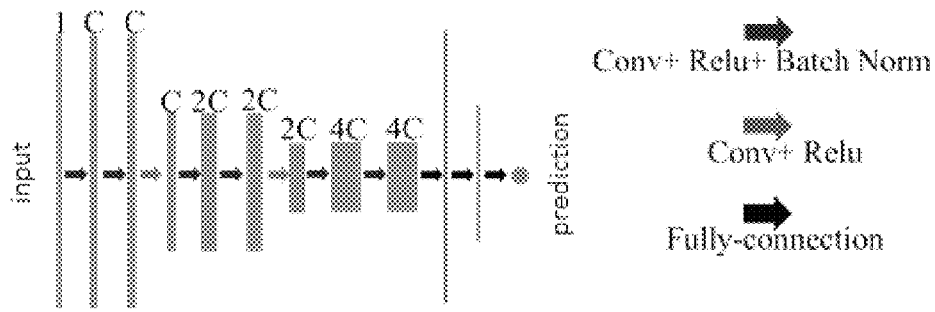

The image denoising neural network and its cost function are shown in FIG. 2, in which the specific structure of the image denoising neural network is shown in FIG. 3(*a*).

Embodiment 3: Denoising of X-Ray CT Projections

The imaging system used in this embodiment is X-ray CT.
Noisy images: noisy projections, with the resolution of 1024*720

Noiseless images: noiseless projections with the resolution of 1024*720

(1) A distance constraint of the noiseless projections is calculated based on a noisy projection distribution. The specific steps are as follows.

(1-1) A group of noisy projection samples $z_1, z_2, z_3, \ldots, z_n$ is collected from a X-ray CT system. Bayesian maximum-a-posterior iterative denoising is performed on the group of noisy projection samples $z_1, z_2, z_3, \ldots, z_n$ that need to be denoised by this method, and initial estimation of estimated noiseless projection samples $\hat{s}_1, \hat{s}_2, \hat{s}_3, \ldots, \hat{s}_n$ is obtained.

(1-2) The noise contained in the noisy projection samples is not additive. Exponential transformation and generalized Anscombe transformation are performed on the noisy projection samples $z_1, z_2, z_3, \ldots z_n$ to obtain the noisy Anscombe projection samples $z_{A1}, z_{A2}, z_{A3}, \ldots, z_{An}$:

$$z_{Ai} = \frac{2}{\gamma} \times \sqrt{\gamma I_0 \exp(-z_i) + 0.375\gamma^2 + \sigma_e^2}, i = 1:n$$

where, $I_0$ is the value of X-ray CT air-value signal, $\gamma$ is the contribution of each photon received by the X-ray CT detector to the electrical signal, and $\sigma_e^2$ is the variance of electronic noise. $I_0$, $\gamma$, $\sigma_e^2$ are measured by actual experiments.

(1-3) Assume that the random vector for additive noise contained in the noisy Anscombe projection samples $z_{A1}, z_{A2}, z_{A3}, \ldots, z_{An}$ is N. According to physical laws, every pixel obeys the standard Gaussian distribution, probability density function $f_N$ of the random vector N is the independent standard Gaussian distribution probability density function of 1024*720 dimensions. Simulated noise samples $n_1^*, n_2^*, n_3^*, \ldots n_n^*$ are collected from the distribution of random vector N, in which the number of the simulated noise samples $n_1^*, n_2^*, n_3^*, \ldots n_n^*$ is the same as the number of noisy Anscombe projection samples $z_{A1}, z_{A2}, z_{A3}, \ldots, z_{An}$.

(1-4) Exponential transformation and generalized Anscombe transformation are performed on the estimated noiseless projection samples $\hat{s}_1, \hat{s}_2, \hat{s}_3, \ldots, \hat{s}_n$ to obtain estimated noiseless Anscombe projection samples $\hat{s}_{A1}, \hat{s}_{A2}, \hat{s}_{A3}, \ldots, \hat{s}_{An}$. The noise samples $n_1^*, n_2^*, n_3^*, \ldots, n_n^*$ and the estimated noiseless Anscombe projection samples $\hat{s}_{A1}, \hat{s}_{A2}, \hat{s}_{A3}, \ldots, \hat{s}_{An}$ are added to obtain the estimated noisy Anscombe projection samples $\hat{z}_{A1}, \hat{z}_{A2}, \hat{z}_{A3}, \ldots, \hat{z}_{An}$, in which $\hat{z}_{Ai} = \hat{s}_{Ai} + n_i^*$, i=1:n.

(1-5) The set for noisy Anscombe projection samples $z_{A1}, z_{A2}, z_{A3}, \ldots z_{An}$ is denoted as $Z_A$, the set for estimated noisy Anscombe projection samples is denoted) as $\hat{Z}_A$, and the distribution distance $D(\hat{Z}_A, Z_A)$ between the distribution of set $\hat{Z}_A$ for estimated noisy Anscombe projection samples and the distribution of set $Z_A$ of real noisy Anscombe projection samples is calculated using the neural network discriminator distance function D as follows.

Assume the distribution distance function D is set to include a neural network discriminator $\Omega_D$ as the distribution distance operator, and the parameter set of the neural network discriminator $\Omega_D$ is $\theta_D$. The set $Z_A$ for noisy Anscombe projection samples and the set $\hat{Z}_A$ for estimated noisy Anscombe projection samples are inputted into the distribution distance function, and the neural network discriminator $\Omega_D$ is used to calculate the cross entropy distance:

$$D(\hat{Z}_A, Z_A) = \sum_{i=1}^{n} [\log(\Omega_D(z_{Ai}; \theta_D)) + \log(1 - \Omega_D(\hat{z}_{Ai}; \theta_D))].$$

Define $D(\hat{Z}_A, Z_A)$ the distribution constraint of noiseless projections.

(2) According to the distribution constraint of noiseless projections, Bayesian denoising is performed on the noisy projections.

(2-1) A Bayesian posterior cost function $\Psi$ is constructed for the group of noisy projection samples that need to be denoised by this method and the corresponding estimated noiseless projection samples:

$$\psi(\hat{s}_1, \hat{s}_2, \hat{s}_3, \ldots, \hat{s}_n) = \sum_{i=1:n} \varphi_f(z_i - \hat{s}_i) + \lambda D(\hat{Z}_A, Z_A)$$

the first term $\varphi_f$ of the Bayesian posterior cost function $\Psi$ is the data fidelity term between $z_1, z_2, z_3, \ldots, z_n$ and $\hat{s}_1, \hat{s}_2, \hat{s}_3, \ldots, \hat{s}_n$ and the second term $D(\hat{Z}_A, Z_A)$ is the distribution constraint, $\lambda$ is the a hyperparameter adjusting the importance of the distribution constraint.

(2-2) The Bayesian posterior cost function $\Psi$ is optimized using the neural network optimization method to obtain the final estimated noiseless projection samples $\hat{s}_1, \hat{s}_2, \hat{s}_3, \ldots \hat{s}_n$, realizing projection denoising.

An image denoising neural network $\Omega_E$ is constructed as an image denoising operator $\hat{s}_i = \Omega_E(z_i; \theta_E)$, $i=1:n$ where $\theta_E$ is the parameter set of the image denoising neural network. The Bayesian posterior cost function $\Psi$ is used to train the image denoising neural network, and a dataset of larger number of noisy projections is used to train the noisy denoising neural network $\Omega_E$ and the neural network discriminator $\Omega_D$ in the distribution constrain:

$$\min_{\theta_E} \max_{\theta_D} \sum_{i=1:n} \varphi_f(z_i - \hat{s}_i) + \lambda D(\hat{Z}_A, Z_A).$$

During inference, noisy projection samples are taken as the input of the image denoising neural network, and final estimated noiseless projection samples are obtained from the output.

Figure 4:
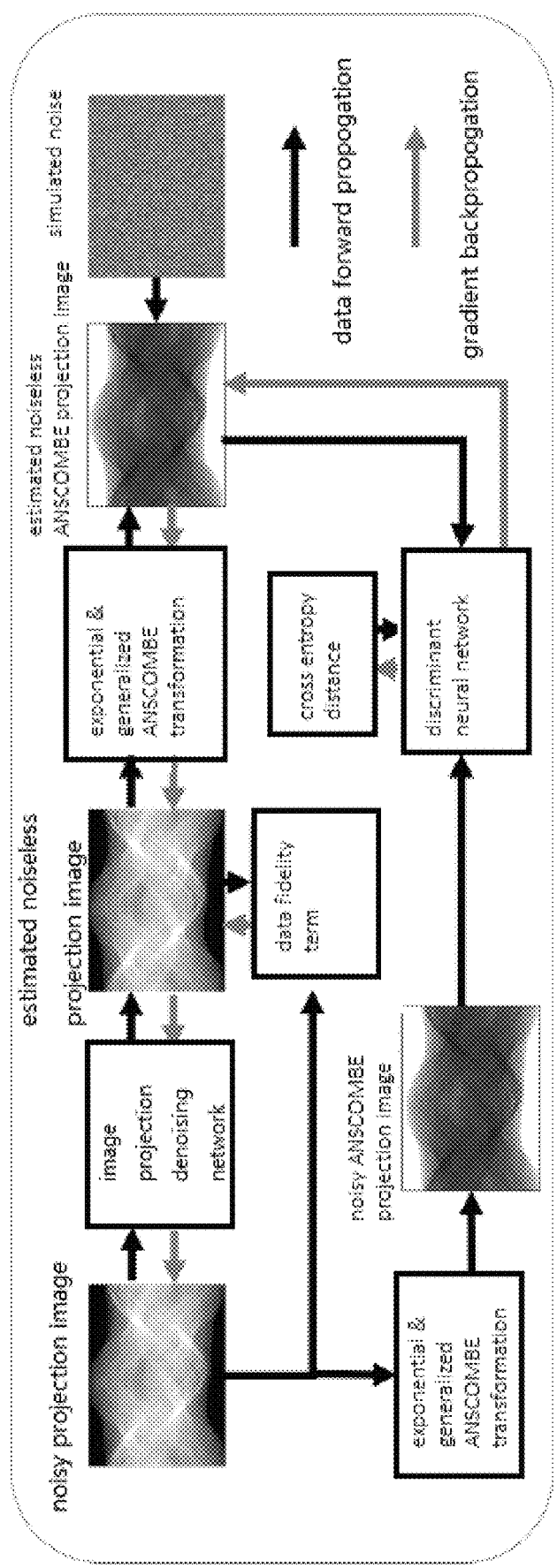
FIG. 4 is a schematic diagram of the image denoising neural network and neural network discriminator of Embodiment 3 of the disclosure and their cost functions.

The image denoising neural network, neural network discriminator and their cost functions are shown in FIG. 4, in which the specific structure of the image denoising neural network is shown in FIG. 3(*a*), and the specific structure of the neural network discriminator is shown in FIG. 3(*b*).

The Bayesian image denoising method based on the distribution constraint from noisy images proposed in the present disclosure has the following advantages.

1. With the method of the present disclosure, when the distribution model of additive noise independent of the signal is known, the distribution estimation of noiseless images may be realized indirectly through the distribution estimation of noisy images. This distribution constraint transformation avoids the need of noiseless images in traditional distribution modeling methods such as dictionary learning, which makes noiseless image distribution modeling easier to implement.

2. The distribution constraints involved in the method of the present disclosure are derived from datasets rather than human settings, so it has flexibility and data specificity. Compared with the manually designed constraint in the traditional Bayesian estimation method, the distribution constraint of the present method is more accurate and can estimate the noiseless image more accurately.

3. With the method of the present disclosure, the distribution constraint and Bayesian estimation process can be implemented with neural network, which makes full use of the powerful image processing and characterization ability of the neural network, so that the distribution constraint of noiseless images is easy to be implemented. Moreover, after the completion of the training, the network can denoise the image in an end-to-end and analytical way, thus greatly reducing the computation amount and computation time, compared with the iterative process of the iterative Bayesian estimation method.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. A Bayesian image denoising method based on a distribution constraint of noiseless images from a distribution of noisy images, comprising:
   determining a distribution constraint of noiseless images from a distribution of noisy images; and
   performing Bayesian denoising on noisy images based on the distribution constraint of noiseless images,
   wherein determining the distribution constraint of noiseless images from the distribution of noisy images comprises:
   for images of which the distribution is difficult to be expressed analytically, or for images of which the distribution is too complex, estimating the distribution constraint of noiseless images by:
   performing analytical filtering or Bayesian iterative denoising on a group of noisy image samples $z_1, z_2, z_3, \ldots, z_n$ to obtain initial estimation of corresponding noiseless image samples $\hat{s}_1, \hat{s}_2, \hat{s}_3, \ldots, \hat{s}_n$;
   estimating a probability density function $f_N$ of a random vector N for additive noise of the imaging system analytically, in which noise samples $n_1^*, n_2^*, n_3^*, \ldots, n_n^*$ are sampled from the distribution of the random vector N, and the number of the noise samples $n_1^*, n_2^*, n_3^*, \ldots, n_n^*$ is the same as that of the noisy image samples $z_1, z_2, z_3, \ldots, z_n$;
   adding the noise samples $n_1^*, n_2^*, n_3^*, \ldots, n_n^*$ and the estimated noiseless image samples $\hat{s}_1, \hat{s}_2, \hat{s}_3, \ldots, \hat{s}_n$ to generate estimated noisy image samples $\hat{z}_1, \hat{z}_2, \hat{z}_3, \ldots, \hat{z}_n$, in which $\hat{z}_i = \hat{s}_i + n_i^*$, $i=1:n$;
   calculating a distribution distance $D(\hat{Z}, Z)$ between a set $\hat{Z}$ for the estimated noisy image samples $\hat{z}_1, \hat{z}_2, \hat{z}_3, \ldots, \hat{z}_n$ and a set Z for the noisy image samples $z_1, z_2, z_3, \ldots, z_n$ according to a distribution distance function D, and determining the distribution distance $D(\hat{Z},Z)$ as the distribution constraint for noiseless images.

2. The method of claim 1, wherein estimating a probability density function $f_N$ of a random vector N for additive noise of the imaging system analytically comprises:

obtaining a distribution form of the random vector N for additive noise according to physical laws of the imaging system, and obtaining the probability density function $f_N$ of the random vector N by measuring distribution parameters of the random vector N through simulation or actual experiments.

3. The method of claim 1, wherein estimating a probability density function $f_N$ of a random vector N for additive noise of the imaging system analytically comprises:

fitting unknown distribution with Gaussian mixture distribution;

wherein, fitting the unknown distribution with Gaussian mixture distribution comprises:

assuming that the random vector N for additive noise obeys a Gaussian mixture distribution, and then obtaining the probability density function $f_N$ of the random vector N for additive noise by measuring Gaussian mixture distribution parameters through simulation or actual experiments.

4. The method of claim 1, wherein estimating a probability density function $f_N$ of a random vector N for additive noise of the imaging system analytically further comprises:

transforming a distribution of non-additive noise into an approximate additive noise through a specific mathematical transformation.

5. The method of claim 1, wherein performing Bayesian denoising on noisy images based on the distribution constraint of noiseless images comprises:

constructing a Bayesian posterior cost function $\Psi$ for the noisy image samples $z_1, z_2, z_3, \ldots, z_n$ and the estimated noiseless image samples $\hat{s}_1, \hat{s}_2, \hat{s}_3, \ldots, \hat{s}_n$ $$\psi(\hat{s}_1, \hat{s}_2, \hat{s}_3, \ldots, \hat{s}_n) = \sum_{i=1:n} \varphi_f(z_i - \hat{s}_i) + \lambda D$$

where, the first term $\varphi_f$ of the Bayesian posterior cost function $\Psi$ is a data fidelity term between the noisy image samples $z_1, z_2, z_3, \ldots, z_n$ and the estimated noiseless image samples $\hat{s}_1, \hat{s}_2, \hat{s}_3, \ldots, \hat{s}_n$, the second term D is the distribution constraint, that is, distribution distance $D(\hat{S},S)$ or the distribution distance $D(\hat{Z},Z)$, $\lambda$ is a hyperparameter adjusting the importance of the distribution constraint; and minimizing the Bayesian posterior cost function $\Psi$ and obtaining final estimated noiseless images $\hat{s}_1, \hat{s}_2, \hat{s}_3, \ldots, \hat{s}_n$.

6. The method of claim 5, wherein the minimizing the Bayesian posterior cost function $\Psi$ adopts a classical mathematical optimization method.

7. The method of claim 6, wherein the classical mathematical optimization method comprises any one of a Lagrange multiplier method, an alternate iteration method, an alternative conjugate least square method or a gradient optimization algorithm.

8. The method of claim 5, wherein minimizing the Bayesian posterior cost function $\Psi$ adopts a neural network optimization method, comprising:

constructing an image denoising neural network $\Omega_E$ as an image denoising operator $\hat{s}_i = \Omega_E(z_i; \theta_E)$, i=1:n, where $\theta_E$ is the parameter set of the image denoising neural network;

taking the Bayesian posterior cost function $\Psi$ as the cost function to train the image denoising neural network, and training the image denoising neural network using a dataset with a large number of noisy image samples; and inputting the noisy image samples into the image denoising neural network $\Omega_E$, and acquiring the estimated noiseless images from network outputs as Bayesian denoising results.

9. The method of claim 1, wherein calculating a distribution distance $D(\hat{Z},Z)$ between a set $\hat{Z}$ for the estimated noisy image samples $\hat{z}_1, \hat{z}_2, \hat{z}_3, \ldots, \hat{z}_n$ and a set Z for the noisy image samples $z_1, z_2, z_3, \ldots, z_n$ according to a distribution distance function D, comprises:

assuming that the distribution distance function D contains a neural network discriminator $\Omega_D$ as a distribution distance operator, in which the neural network discriminator $\Omega_D$ has a parameter set $\theta_D$; and using the distribution of the set $\hat{Z}$ for estimated noisy image samples and the distribution of the set Z for real noisy image samples to compute distribution distance $D(\hat{Z},Z)$, where the distribution distance function D is defined by a cross entropy distance function, which is realized by the neural network discriminator $\Omega_D$:

$$D(\hat{Z}, Z) = \sum_{i=1:n} \log(\Omega_D(z_i; \theta_D)) + \log(1 - \Omega_D(\hat{z}_i; \theta_D))$$

or a Wasserstein distance function:

$$D(\hat{Z}, Z) = \sum_{i=1:n} |\Omega_D(z_i; \theta_D) - \Omega_D(\hat{z}_i; \theta_D)|.$$

10. The method of claim 1, wherein calculating a distribution distance $D(\hat{Z},Z)$ between a set $\hat{Z}$ for the estimated noisy image samples $\hat{z}_1, \hat{z}_2, \hat{z}_3, \ldots, \hat{z}_n$ and a set Z for the noisy image samples $z_1, z_2, z_3, \ldots, z_n$ according to a distribution distance function D, comprises:

assuming that the distribution distance function D contains a neural network discriminator $\Omega_D$ as a distribution distance operator, in which the neural network discriminator $\Omega_D$ has a parameter set $\theta_D$; and using the distribution of the set $\hat{Z}$ for estimated noisy image samples and the distribution of the set Z for real noisy image samples to compute distribution distance $D(\hat{Z},Z)$ where the distribution distance function D is defined by a distribution distance function in generative adversarial network methods in the generative adversarial network field.

11. The method of claim 10, wherein the distribution distance function in the generative adversarial network methods in the generative adversarial network field comprises the distribution distance function of any one of Standard GAN (SGAN), Region-Separative GAN (RS-GAN), Relativistic average Standard GAN (RaSGAN), Least Squares GAN (LSGAN) Relativistic average Least Squares GAN (RaLSGAN), Hinge-loss GAN (HingeGAN), Wasserstein GAN with Gradient Penalty (WGAN-GP), Region-Separative GAN with Gradient Penalty (RSGAN-GP) or Relativistic average Standard GAN with Gradient Penalty (RaSGAN-GP).

\* \* \* \* \*